Sept. 5, 1944.　　　P. W. DAMON　　　2,357,384
STERILIZING HOOD FOR CREAM SEPARATORS
Original Filed Feb. 26, 1919　　2 Sheets-Sheet 1
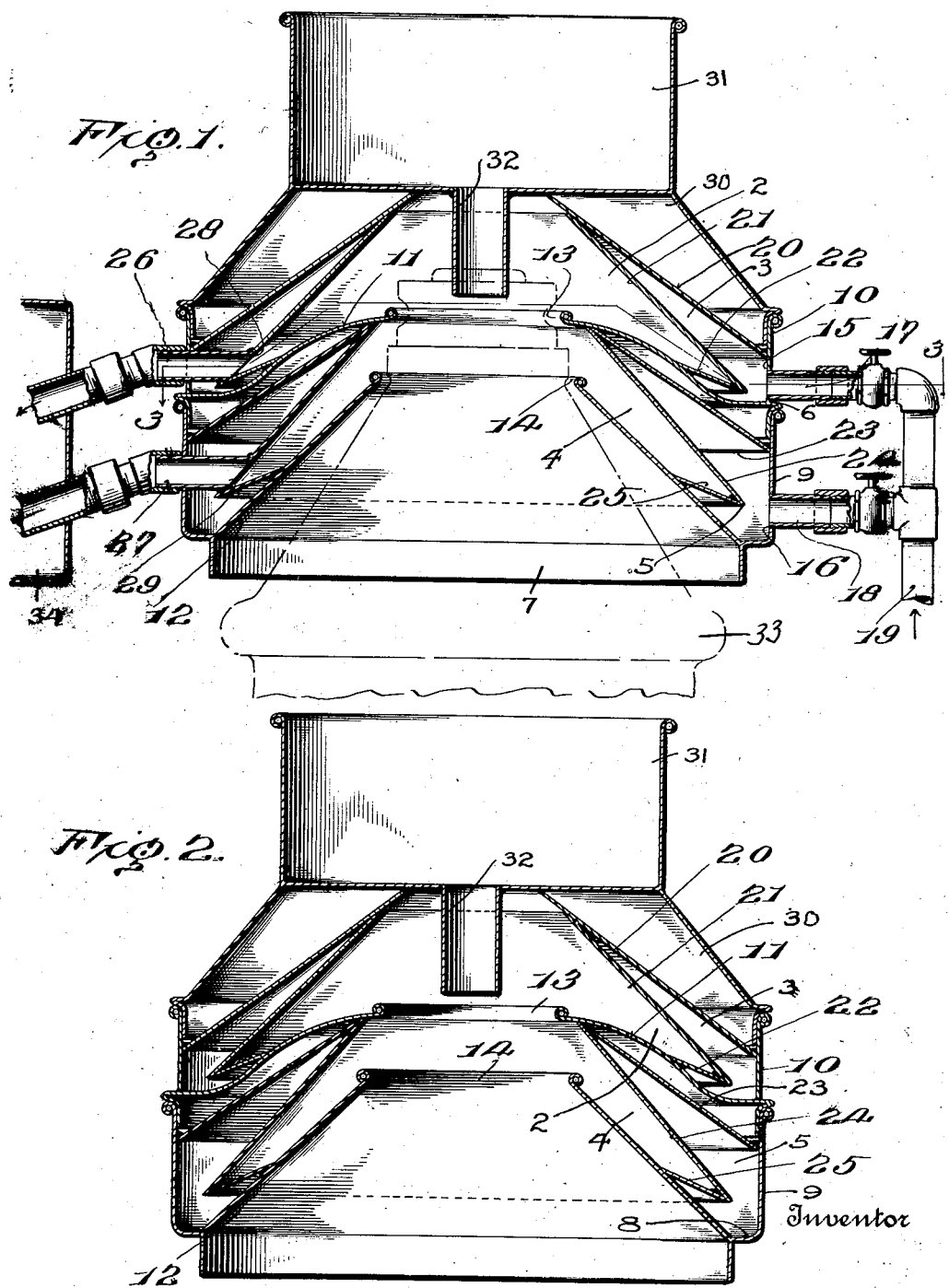

Sept. 5, 1944.  P. W. DAMON  2,357,384
STERILIZING HOOD FOR CREAM SEPARATORS
Original Filed Feb. 26, 1919   2 Sheets-Sheet 2
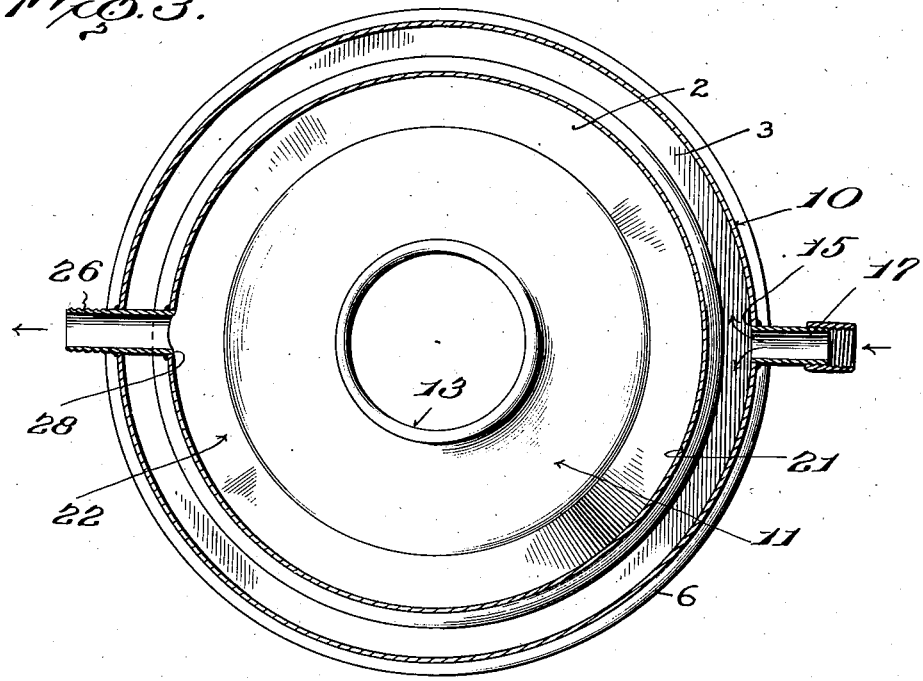
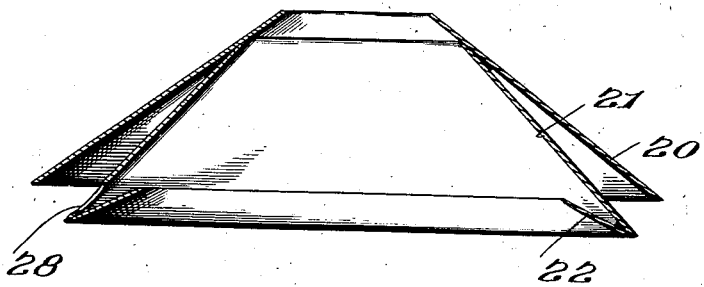

Patented Sept. 5, 1944

2,357,384

UNITED STATES PATENT OFFICE 2,357,384

STERILIZING HOOD FOR CREAM SEPARATORS

Peter W. Damon, Barton, Vt.

Substituted for abandoned application Serial No. 279,352, February 26, 1919. This application August 30, 1941, Serial No. 409,103

6 Claims. (Cl. 257—243)

This invention relates to an improved sterilizing hood for use in connection with a centrifugal cream separator, and one object of the invention is to provide a sterilizing hood so constructed that the body portion thereof may be formed from a hood such as is ordinarily used in connection with a centrifugal separator.

Another object of the invention is to so construct this sterilizing hood that the ordinary hood of a centrifugal separator may be converted into the improved construction by adding partitions which will divide the usual cream and milk compartments of the hood and thus provide milk and cream compartments which are enclosed in compartments receiving the steam.

Another object of the invention is to so construct this sterilizing hood that the reservoir into which the milk will be poured may be carried by a cap fitting upon the body portion of the hood, the reservoir being provided with a centrally located depending outlet pipe which will extend down into the centrifugal separator. This invention is illustrated in the accompanying drawings, in which Figure 1 is a view showing the improved sterilizing hood in vertical section, the centrifugal separator being indicated in dotted lines, Figure 2 is a vertical sectional view through the sterilizing hood taken at right angles to the disclosure in Figure 1, Figure 3 is a transverse sectional view taken along the line 3—3 of Figure 1, and Figure 4 is a vertical sectional view through a set of partitions forming the invention.

This improved sterilizing hood is used in connection with a centrifugal separator which is indicated by dotted lines in Figure 1 and designated by the numeral 33. A hood which is of a conventional construction is provided about the upper portion of the separator drum 33 as shown in Figure 1 and will be provided with the improvements forming the subject-matter of this invention so that this hood will be converted from a hood of a conventional construction to the improved sterilizing hood.

This hood is provided with a lower section 9, and an upper section 10 which fits into the lower section is provided with an outstanding bead 6 which engages the upper edge of the lower section so that the upper section will be supported upon the lower section. The lower section is provided with an inwardly extending flange 8 which carries a depending neck 7 and further carries an upwardly extending frusto-conical wall 12 having a centrally located opening 14 through which the separator drum 33 extends. The upper section 10 is also provided with a substantially frusto-conical lower wall 11 which extends upwardly into the upper section and is provided with a centrally located opening 13 positioned in alignment with the opening 14 of the wall 12 so that the upper end of the separator drum may extend through this wall 11 into the upper section 10 of the hood. It will thus be seen that the hood will be placed about the upper end portion of the separator drum 33 in the usual manner and the separated milk and cream will pass from the separator drum into the upper and lower sections of the hood.

In order to convert the hood into a sterilizing hood, the upper section will be provided with frusto-conical partitions 20, 21 and 22, and the lower section will be provided with frusto-conical partitions 23, 24 and 25. From an inspection of Figures 1 and 2 it will be readily seen that the partitions 20 and 23 form upper walls for the upper and lower sections of the hood and that these partitions or walls will be soldered or otherwise rigidly connected with the side walls of the upper and lower sections of the hood. The partition 21 has its upper central portion soldered or otherwise rigidly connected with the partition 20, and this partition terminates in spaced relation to the side walls of the upper section and is rigidly connected with the outer edge portion of the partition 22. This partition 22 fits about the lower wall 11 and is rigidly connected with this lower wall. It will be thus seen that the partitions 21 and 22 serve to divide the space between the partition or wall 20 and wall 11 into inner and outer compartments 2 and 3, the inner compartment 2 being the cream compartment and the outer compartment 3 a steam compartment.

In order to similarly divide the lower section of the hood into a milk compartment 4 and steam compartment 5 there has been provided frusto-conical partitions 23, 24, and 25. This partition 23 is soldered or otherwise rigidly connected with the side walls of the lower section 9 and is connected with the upper central portion of the partition 24 about the central opening formed therein. This partition 24 is soldered or otherwise rigidly connected with the side walls of the lower section 9 and is connected with the upper central portion of the partition 24 about the central opening formed therein. This partition 24 has its outer end 14 terminating in spaced relation to the side walls of the lower section 9 and is rigidly connected with the outer edge portion of the partition 25. This partition 25 fits about and is rigidly connected with the lower wall 12 of the lower section.

The upper section of this sterilizing hood carries a cap or head 30 upon which is mounted the reservoir 31 into which the milk to be separated will be poured, and this reservoir is provided with a centrally located depending outlet pipe 32 which extends down into the upper end of the centrifugal separator drum 33 when the hood is in place, as shown in Figure 1. The cream will be separated from the milk in this drum in the usual manner and the cream will pass out of the drum into the cream chamber 2, the skimmed milk passing from the drum into the milk chamber 4. Steam is admitted to the steam chambers 3 and 5 through branch pipes 17 and 18 which lead from the steam pipe 19 through openings 15 and 16 formed in the side walls of the upper and lower sections 9 and 10 of the sterilizing hood. This steam will heat the cream and milk in the chambers 2 and 4, and the cream and milk will thus be thoroughly sterilized as they pass through the sterilizing hood. The milk and cream pass from the chambers 2 and 4 through outlet pipes 26 and 27 which extend through the upper and lower sections of the sterilizing drum and fit into openings 28 and 29 formed in partitions 21 and 24. These pipes may be led through a compartment 34 containing ice water or some other cooling medium so that the heated milk and cream may be cooled.

When in use, this sterilizing hood is placed over the upper end portion of the separator drum 33 and the milk is poured into the reservoir 31 from which it passes into the drum through the pipe 32. The cream and skimmed milk will pass from the drum into the compartments or chambers 2 and 4 where they will be sterilized by the heat from the steam in the chambers 3 and 5, and the milk and cream will then pass out of the chambers 2 and 4 through the outlet pipes 26 and 27. When it is desired to clean this sterilizing hood the head or cap 30 will be removed from the upper section of the hood and the upper section removed from the lower section. The two sections of the hood and the head can then be easily and thoroughly cleaned and the hood re-assembled. There has thus been provided a sterilizing hood which is so constructed that the body portion thereof will have a construction similar to that of a conventional hood for a centrifugal separator. There has further been provided a sterilizing hood which is simple in construction and efficient in operation.

The present application is a substitute for applicant's application filed February 26, 1919, Serial Number 279,352.

What is claimed, is:

1. A sterilizing hood for cream separators, including upper and lower separable sections, said sections each having an enclosing outer wall, upper and lower frusto-conical walls connected to the outer wall of each section, said lower walls having aligning central openings, frusto-conical partition members having their smaller ends connected to the under sides of said upper walls, other frusto-conical partition members having their smaller ends connected to the upper sides of said lower walls, and said frusto-conical partition members having their other ends connected together whereby to divide the interiors of the sections into non-intercommunicating spaces for cream, milk and a medium for heat exchange therewith.

2. A sterilizing hood for cream separators including a shell having vertically spaced frusto-conical walls dividing the shell into upper and lower compartments, and generally frusto-conical partitions in each compartment extending between the top and bottom walls thereof, dividing the compartments into non-intercommunicating spaces adapted to receive milk or cream and a medium for heat exchange therewith.

3. A sterilizing hood for cream separators including a shell having vertically spaced frusto-conical walls forming upper and lower compartments, generally frusto-conical partitions extending between the walls of said compartments with the smaller end connected to the upper wall of the compartment and the larger end connected to the bottom wall, thus forming overlapping non-intercommunicating spaces in each of the upper and lower compartments, the innermost spaces of said compartments being adapted to receive cream and milk, respectively and the outermost spaces being adapted to receive a medium for heat exchange therewith.

4. A sterilizing hood for cream separators including upper and lower sections, each section having top and bottom frusto-conical walls and an outer side wall, generally frusto-conical partitions disposed between the top and bottom walls of each section having their smaller ends connected to the top walls adjacent the inner edge thereof and their larger ends reversely extended and connected to the bottom walls at a point intermediate the inner and outer edges of the bottom wall, said partitions forming non-intercommunicating spaces to receive cream or milk and a medium for heat exchange therewith.

5. A sterilizing hood for cream separators including upper and lower compartments having top, bottom and side walls, and partitions between the top and bottom walls of each compartment surrounding the center thereof and spaced from the side walls to divide the interior of said compartments into central and outer sections adapted to receive milk or cream and a medium for heat exchange therewith, respectively.

6. A sterilizing hood for cream separators including upper and lower separable sections, said sections each having an enclosing outer wall, upper and lower frusto-conical walls connected to the outer wall of said section, said lower walls having aligning central openings, and upwardly extending generally frusto-conical partitions having their smaller ends connected to the underside of the upper walls and their larger ends connected to the upper side of said lower walls whereby to divide the interiors of said sections into non-intercommunicating spaces for cream, milk and a medium for heat exchange therewith.

PETER W. DAMON.